United States Patent [19]

Hayden, Sr.

[11] 4,258,084
[45] Mar. 24, 1981

[54] METHOD OF REDUCING FUEL CONSUMPTION BY PEENING

[75] Inventor: Robert E. Hayden, Sr., Cerritos, Calif.

[73] Assignee: Potters Industries, Inc., Hasbrouck Heights, N.J.

[21] Appl. No.: 952,055

[22] Filed: Oct. 17, 1978

[51] Int. Cl.³ .............................................. B05D 7/22
[52] U.S. Cl. ...................................... 427/239; 72/53; 427/369; 427/276; 427/289; 123/193 C; 92/153; 92/159
[58] Field of Search ..................... 123/193 C, 193 CP; 92/153, 159; 308/241; 72/53; 427/11, 239, 289, 276, 355, 369

[56] References Cited

U.S. PATENT DOCUMENTS

| | | | |
|---|---|---|---|
| 1,481,936 | 1/1924 | Thomson | 308/241 |
| 1,964,671 | 6/1934 | Nesbitt | 308/241 |
| 2,373,871 | 4/1945 | Connor et al. | 308/241 |
| 2,387,872 | 10/1945 | Bell | 308/241 |
| 2,434,880 | 1/1948 | Branberry | 308/241 |
| 3,063,763 | 11/1962 | Zubrisky | 308/241 |
| 3,574,658 | 3/1971 | Fulk | 308/241 |

FOREIGN PATENT DOCUMENTS 1233649  5/1971  United Kingdom ............... 123/193 C

OTHER PUBLICATIONS

Shot Peening, p. 19, American Wheelabrator & Equipment Corp.

Primary Examiner—Sam Silverberg
Attorney, Agent, or Firm—Lee C. Robinson, Jr.

[57] ABSTRACT

A method of reducing fuel and oil consumption in an internal combustion engine in which the cylinder walls of the engine are peened with glass spheres having a diameter within the range of form about 0.002 inches to about 0.004 inches. The glass spheres form a multiplicity of local depressions and surface compression at the points of impact and are directed against the cylinder walls for a period of time sufficient to form the depressions over the entire surface area without leaving flat portions of the surface between the depressions. In some embodiments the cylinder walls are coated with a lubricating agent such as graphite prior to being peened. After the peening step the walls are lightly honed to produce substantially flat supporting areas between the individual depressions.

11 Claims, 4 Drawing Figures

METHOD OF REDUCING FUEL CONSUMPTION BY PEENING

BACKGROUND OF THE INVENTION

This invention relates to a method of peening surfaces and more particularly to a method of peening relatively movable surfaces in an internal combustion engine to reduce the fuel and lubricant consumption of the engine.

The present invention, while of general application, is particularly well suited for use in the peening of the cylinder sleeves or walls in an internal combustion engine of the reciprocating type. As is well known, such engines include one or more pistons which customarily are provided with rings in sliding contact with the inner cylindrical walls of the sleeves or cylinders of the engine. The frictional resistance to this sliding contact is a function, inter alia, of the amount and quantity of lubricant between the cylinder walls and the piston rings, the hardness of the wall surfaces, and the smoothness of the walls, both initially and after being subjected to wear following the operation of the engine over an extended period. As the frictional resistance between these relatively movable surfaces decreases, the amount of energy needed to operate the engine also decreases with a corresponding reducton in the engine's fuel consumption.

Heretofore, attempts to reduce the frictional resistance between relatively movable surfaces in an internal combustion engine have exhibited a number of disadvantages. As an illustration, in many engines of this type it is advantageous to maintain a thin film of oil or other liquid lubricant between the two surfaces. If the surfaces are excessively smooth, the lubricant does not readily stay in place, and yet as the roughness of the surface increases there is a corresponding increase in friction. Primarily because of the close tolerances required between such components as the piston rings and the cylinder walls, prior peening techniques have not been entirely satisfactory in resolving the problem of providing sufficiently smooth surfaces while at the same time retaining a sufficient degree of roughness for good lubricant retention. In addition, in many cases the depressions resulting from the peening particles have been too large and deep to be of real practical value, while in other instances the particles left a multiplicity of irregularly shaped indentations which again were unsatisfactory in providing a meaningful reduction in frictional resistance and hence fuel consumption.

SUMMARY

One general object of this invention, therefore, is to provide a new and improved method of reducing frictional resistance between relatively movable surfaces.

More specifically, it is an object of the invention to provide a method of reducing frictional resistance and hence fuel consumption in an internal combustion engine.

Another object of the invention is to provide such a method in which the engine's consumption of oil or other lubricant is substantially reduced.

Still another object of the invention is to provide a method of the character indicated in which the relatively movable surfaces are peened in a manner which achieves the desired smoothness and yet leaves a series of minute uniform depressions for good lubricant retention.

A further object of the invention is to provide a method of reducing frictional resistance which is economical and thoroughly reliable in operation.

In one illustrative embodiment of the invention, one or more cylinder sleeves of an internal combustion engine are peened by propelling glass spheres toward the inner cylindrical surface of the sleeve at a velocity and for a period of time sufficient to apply the spheres to the entire area of the surface. The glass spheres form a multiplicity of local depressions and surface compression at the points of impact.

In accordance with one feature of the invention, the diameter of the glass spheres is carefully controlled to similarly control the size of the individual depressions. In certain particularly advantageous embodiments, the sphere diameter is maintained below about 0.004 inches and preferably within the range of from about 0.002 inches to about 0.004 inches. With this arrangement, the desired surface smoothness is achieved while at the same time providing a large number of small depressions for good lubricant retention.

In accordance with another feature of the invention, in several good arrangements, a dry lubricant is applied to the surface to be peened. As the glass spheres are directed toward the thus lubricated surface, the lubricant is imbedded in the surface at the points of impact and imparts an even greater smoothness thereto.

In accordance with a further feature of the invention, in a number of advantageous embodiments, the thus peened surface is lightly honed to produce substantially flat supporting areas between the individual depressions. The supporting areas are easily maintained at the required tolerances, and the uniform distribution of the depressions therebetween provides a further improvement in the lubricant retention characteristics of the surface.

The present invention, as well as further objects and features thereof, will be understood more clearly and fully from the following description of a preferred embodiment, when read with reference to the accompanying drawings.

DESCRIPTION OF A PREFERRED EMBODIMENT

Figure 1:
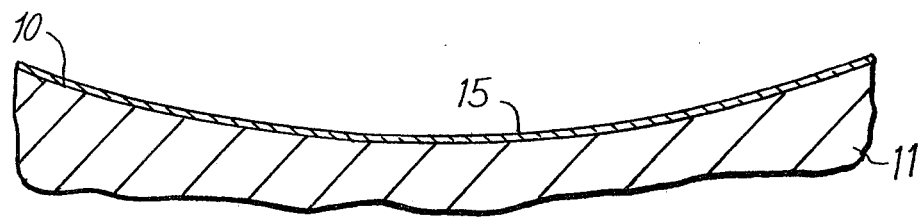
FIG. 1 is an enlarged fragmentary sectional view of an internal combustion engine cylinder wall with a lubricating agent applied thereto in accordance with a first step of the method of an illustrative embodiment of the invention.

Referring to FIG. 1 of the drawings, there is shown a cylinder wall 10 for an internal combustion engine of the reciprocating type. The wall 10 comprises the inner cylindrical surface of a sleeve 11, illustratively of cast iron, for one of the cylinders of the engine. As will be understood, the inner surface of the sleeve cooperates with the relatively movable external surface of one or more piston rings (not shown in FIG. 1) carried by a piston which reciprocates within the cylinder during the operation of the engine.

The cylinder wall 10 is first coated with a lubricating agent 15. Although a wide variety of lubricating agents in both liquid and solid form may be employed in accordance with the invention, particularly good results are obtained with a dry lubricant such as graphite. The graphite is spread evenly over the entire cylinder wall surface in a thin layer to cover the area exposed to the reciprocating piston rings. In other embodiments molybdenum disulfide particles are sprinkled over the surface to form an even coating thereon.

Figure 2:
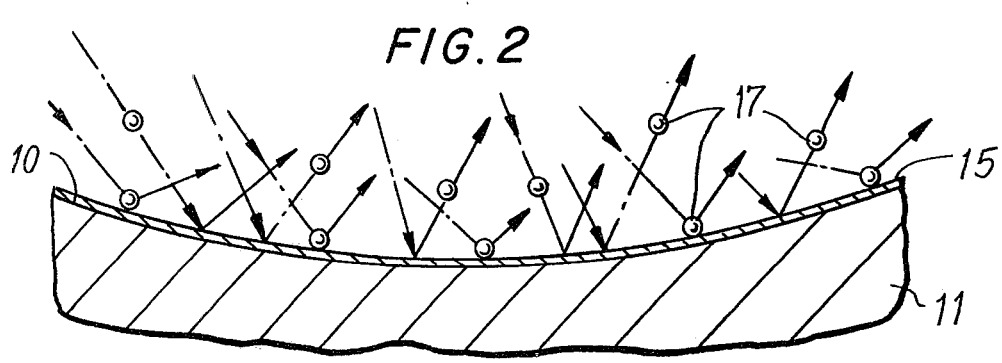
FIG. 2 is an enlarged fragmentary sectional view similar to FIG. 1 but illustrating the peening step of the method.
Figure 3:
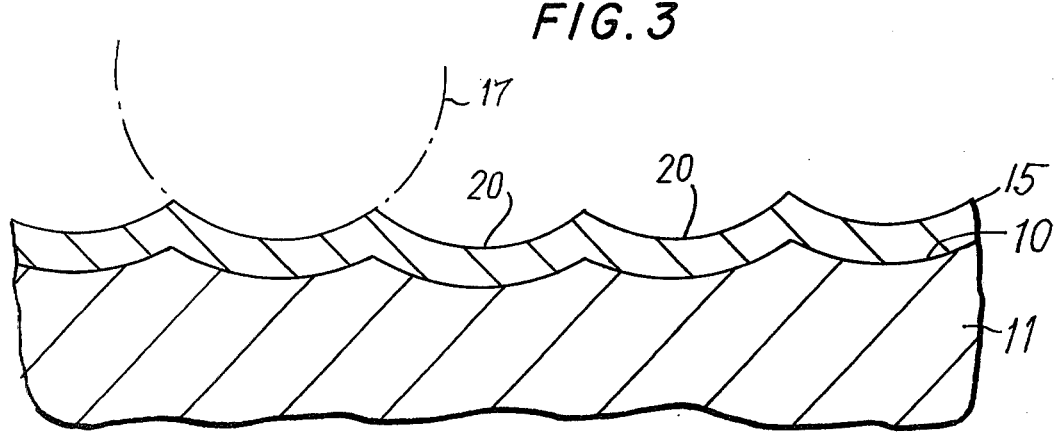
FIG. 3 is a further enlarged fragmentary sectional view of the cylinder wall upon the completion of the peening step.

As best shown in FIG. 2, the cylinder wall 10 is then peened to saturation by propelling a multiplicity of glass beads or spheres 17 toward the thus lubricated surface. The spheres 17 are directed against the surface at a velocity sufficient to form a multiplicity of local depressions 20 (FIG. 3). The spheres serve to compress and harden the surface at the impact points and to imbed the lubricating agent 15 over the entire surface area. The sphere velocity is maintained sufficiently low, however, to avoid fracturing the spheres and thus preventing the recycling thereof for use in subsequent peening operations. Such recycling not only substantially reduces the cost of the process, but since large quantities of natural gas are used in the manufacture of the spheres it assists in the overall conservation of energy.

As has been explained, the cylinder wall 10 is peened to saturation. That is, the spheres 17 are propelled toward the surface for a period of time which is just sufficient to form the depressions 20 over the entire surface area without leaving flat portions of the surface between the depressions. If the peening operation were to be carried on beyond that time, there would be no additional beneficial effect, and the impact of the spheres could well upset the desired dimensional tolerances. In cases in which the peening time is insufficient, on the other hand, the surface exhibits deleterious nonuniformity characteristics, and the lubricating agent 15 is not properly held in place.

The diameter of the glass spheres 17 is carefully controlled to provide an optimum reduction in the fuel consumption of the engine while at the same time minimizing oil consumption and engine wear. This diameter advantageously is below about 0.004 inches and preferably lies within the range of from about 0.002 inches to about 0.004 inches to provide depressions 20 of similar diameter in the surface 10. If the diameter of the spheres exceeds about 0.004 inches, the surface exhibits excessive roughness, and the oil consumption and wear of the engine increases substantially. For sphere diameters much below about 0.002 inches, the oil consumption of the engine similarly is excessive, and the reduction in friction becomes too small to have much of a practical effect.

Following the application of glass spheres within the indicated size range to the cylinder wall 10, there is a very substantial increase in the smoothness of the wall surface. The surface exhibits a smooth satin-like finish with a marked decrease in resistance to friction. This decrease in frictional resistance arises not only because of the lubricating agent 15 imbedded in the surface but also as a result of the increased surface hardness and the fact that there is less surface area contact between the cylinder wall and its cooperating piston ring. In addition, upon the assembly of the peened cylinder wall and piston ring in an internal combustion engine having the usual system for introducing liquid lubricant into the cylinder, the depressions 20 greatly facilitate the retention of the lubricant on the cylinder wall.

Figure 4:
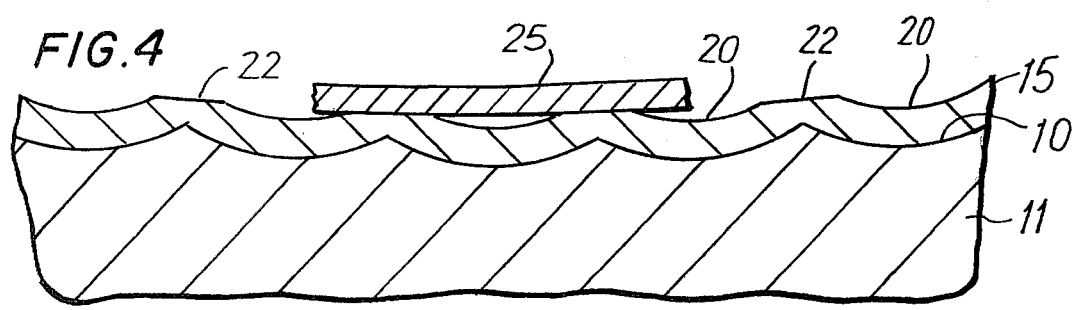
FIG. 4 is an enlarged fragmentary sectional view similar to FIG. 3 but showing the cylinder wall following the honing step of the method, together with a cooperating piston ring.

In a number of advantageous embodiments of the invention, following the application of the glass spheres 17 to the cylinder wall 10 the wall is slightly honed to remove the various peaks between adjacent depressions 20. As best seen in FIG. 4, such honing produces flat supporting areas 22 between the individual depressions 20 which are in surface-to-surface contact with the adjacent piston ring 25. To prevent premature wear of the piston ring, the honing step preferably is carried out prior to the assembly of the engine, although in some cases the engine is assembled and the honing is accomplished by the action of the piston ring as the engine is operated during its warm-up period. The flat areas 22 further facilitate the retention of oil or other liquid lubricant of the cylinder wall.

In order to more thoroughly disclose the nature of the present invention, the following examples illustrating the invention are given. It should be understood, however, that this is done solely by way of example and is intended neither to delineate the scope of the invention nor limit the ambit of the appended claims.

EXAMPLE I

As an example of the effectiveness of the method of the present invention in the reduction of fuel consumption in an internal combustion engine, a nine horsepower Briggs & Stratton four cycle, one cylinder reciprocating engine was disassembled, and the cylinder was rebored to accept identical cast iron sleeves of known homogeneous quality. The engine included an aluminium piston and connecting rod, and the main bearings were sleeve-type bushings.

The inner cylindrical surface of one of the cast iron sleeves was then peened with glass spheres in the manner described above. The diameter of the spheres ranged from about 0.002 inches to about 0.004 inches, and the peening was continued at a velocity and for a period of time sufficient to form a multiplicity of local depressions and surface compression at the points of impact without leaving any flat unpeened areas between the depressions.

The thus peened sleeve was installed in the cylinder block of the engine, and the engine was reassembled with new unpeened piston rings. After an extended break-in period to be sure operating conditions had stabilized, the engine was run with fresh unleaded gasoline for a period of thirty hours under constant operating parameters. During the thirty hour test period, the engine consumed 915 ml per hour of gasoline and 125 ml of lubricating oil. Upon the completion of the test, the lubricating oil was analyzed and found to contain 31 parts per million of iron particles.

EXAMPLE II

To provide a control, the foregoing test was repeated using a new unpeened cast iron cylinder sleeve of conventional construction. The fuel consumption of the engine with the unpeened sleeve over the thirty hour test period was 937 ml per hour, and the engine consumed 225 ml of lubricating oil. The analysis of the libricating oil showed an iron content of 50 parts per million for the thirty hour run.

The tests of Examples I and II demonstrated a reduction in fuel consumption of 22 ml per hour through the use of the cylinder sleeve peened in accordance with the invention. The reduction in oil consumption was 100 ml during the thirty hour test run. The lower iron content of the lubricating oil after being used with the peened sleeve showed that there was substantially less engine wear than with the conventional sleeve.

EXAMPLE III

The procedure of Example I was repeated using a new cast iron cylinder sleeve having an inner cylindrical surface peened with glass spheres ranging in diameter from about 0.001 inches to about 0.002 inches. The fuel consumption during the thirty hour test was 924 ml per hour, and the oil consumption was 135 ml. Although the fuel and oil consumption were thus lower than the corresponding measurements with the unpeened control sleeve of Example II, the savings were not nearly so great as those achieved in Example I. In addition, the iron content of the lubricating oil for the engine of the present example was 53 parts per million. There was thus no measurable reduction in engine wear over that of Example II.

EXAMPLE IV

The procedures of Examples I and II were repeated using a one-half horsepower Briggs & Stratton internal combustion engine. The inner cylindrical surface of a new cast iron cylinder for the engine was peened with glass spheres having a diameter within the range of from about 0.004 inches to about 0.008 inches. The fuel consumption of the engine with the peened cylinder was 765 ml per hour over the thirty hour test run. The consumption of lubricating oil, however, rose to an unacceptable level. The measured oil consumption during the thirty hour test with the peened cylinder was 270 ml.

EXAMPLE V

A used Volkswagen engine was disassembled, and the various seals were replaced to prevent oil leakage. While dismantled, the cylinder, piston rings and other engine parts having relatively movable sliding surfaces were peened with glass spheres having a diameter within the range of from about 0.002 inches to about 0.004 inches. When the engine was reassembled and operated, the fuel and oil consumption were substantially reduced. In addition, the engine operated at a lower temperature, and there was a noticeable increase in output power.

EXAMPLE VI

When the procedure of Example I is repeated and the inner cylindrical surface of the cylinder sleeve is lightly honed following the peening step, a further reduction is observed in both fuel and oil consumption.

EXAMPLE VII

In cases in which the inner cylindrical surface of the cylinder sleeve is provided with an even coating of graphite prior to the peening step, the fuel and oil consumption of the engine is again reduced.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

What is claimed is:

1. A method of reducing fuel and oil consumption in an internal combustion engine having relatively movable surfaces, the method comprising the steps of:
   applying a lubricating agent to at least one of the relatively movable surfaces of said engine; and
   propelling glass spheres toward the thus lubricated surface at a velocity sufficient to form a multiplicity of local depressions and surface compression at the points of impact but insufficient to fracture the spheres, the diameter of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions.

2. A method of reducing fuel consumption in an internal combustion engine having relatively movable surfaces, the method comprising the steps of:
   applying a dry lubricant to at least one of the relatively movable surfaces of said engine; and
   propelling glass spheres toward the thus lubricated surface at a velocity sufficient to form a multiplicity of local depressions and surface compression at the points of impact but insufficient to fracture the spheres, the diameter of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions.

3. A method of reducing frictional resistance between relatively movable surfaces, the method comprising the steps of:
   applying a dry lubricant to at least one of the relatively movable surfaces;
   propelling glass spheres toward the thus lubricated surface at a velocity sufficient to form a multiplicity of local depressions and surface compression at the points of impact but insufficient to fracture the spheres, the diameter of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions; and
   lightly honing the surface to produce substantially flat supporting areas between the individual depressions.

4. A method as defined in claim 3, in which graphite is used as the dry lubricant.

5. A method as defined in claim 3 in which molybdemum disulfide is used as the dry lubricant.

6. A method of reducing fuel and oil consumption in an internal combustion engine having relatively movable surfaces, the method comprising the steps of:

applying a dry lubricant to at least one of the relatively movable surfaces of said engine;

propelling glass spheres toward the thus lubricated surface at a velocity sufficient to form a multiplicity of local depressions and surface compression at the points of impact but insufficient to fracture the spheres, the diameter of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions;

lightly honing the surface to produce substantially flat supporting areas between the individual depressions; and recycling said spheres by propelling the same toward another relatively movable surface of said engine.

7. A method of reducing fuel consumption in a reciprocating internal combustion engine having at least one cylinder wall with an inner cylindrical surface, the method comprising the steps of:

applying a dry lubricant to the cylindrical surface of said cylinder wall; and propelling glass spheres toward the thus lubricated surface at a velocity sufficient to form a multiplicity of local depressions and surface compression at the points of impact but insufficient to fracture the spheres, the diameter of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions.

8. A method of reducing fuel and oil consumption in an internal combustion engine having at least one cylinder wall with an inner cylindrical surface, the method comprising the steps of:

applying a dry lubricant to the cylindrical surface of said cylinder wall;

propelling glass sphere toward the thus lubricated surface at a velocity sufficient to form a multiplicity of local depressions and surface compression at the points of impact but insufficient to fracture the spheres, the diameters of the glass spheres lying within the range of from about 0.002 inches to about 0.004 inches to provide depressions of similar diameter in said surface, and the spheres being directed against the surface for a period of time sufficient to saturate said surface with said depressions over the entire surface area without leaving flat portions of the surface between the depressions; and lightly honing the surface to produce substantially flat supporting areas between the individual depressions.

9. A method as defined in claim 8, in which graphite is used as the dry lubricant.

10. In a method of reducing fuel and oil consumption in an internal combustion engine having relatively movable surfaces, the steps of:

propelling glass spheres toward at least one of the relatively movable surfaces of said engine at a velocity sufficient to form a multiplicity of local depressions and surface compression at the points of impact but insufficient to fracture the spheres;

the diameter of the glass spheres directed toward said surface lying within the range of from about 0.002 inches to about 0.004 inches to provide depressions of similar diameter in said surface;

the spheres being directed against the surface for a period of time sufficient to saturate said surface with said depressions over the entire surface area without leaving flat portions of the surface between the depressions.

11. In a method of reducing fuel and oil consumption in an internal combustion engine having relatively movable surfaces, the steps of:

propelling glass spheres toward at least one of the relatively movable surfaces of said engine at a velocity sufficient to form a multiplicity of local depressions and surface compression at the points of impact but insufficient to fracture the spheres;

the diameter of the glass spheres directed toward said surface lying within the range of from about 0.002 inches to about 0.004 inches to provide depressions of similar diameter in said surface;

the spheres being directed against the surface for a period of time sufficient to saturate said surface with said depressions over the entire surface area without leaving flat portions of the surface between the depressions; and lightly honing the surface to produce substantially flat supporting areas between the individual depressions.

* * * * *